Jan. 29, 1963 D. M. HAM 3,075,392
MECHANISM FOR RESETTING ROTATABLE SHAFTS
Filed Jan. 23, 1961 3 Sheets-Sheet 1

Inventor,
Donald M. Ham,
by Francis K. Doyle
His Attorney.

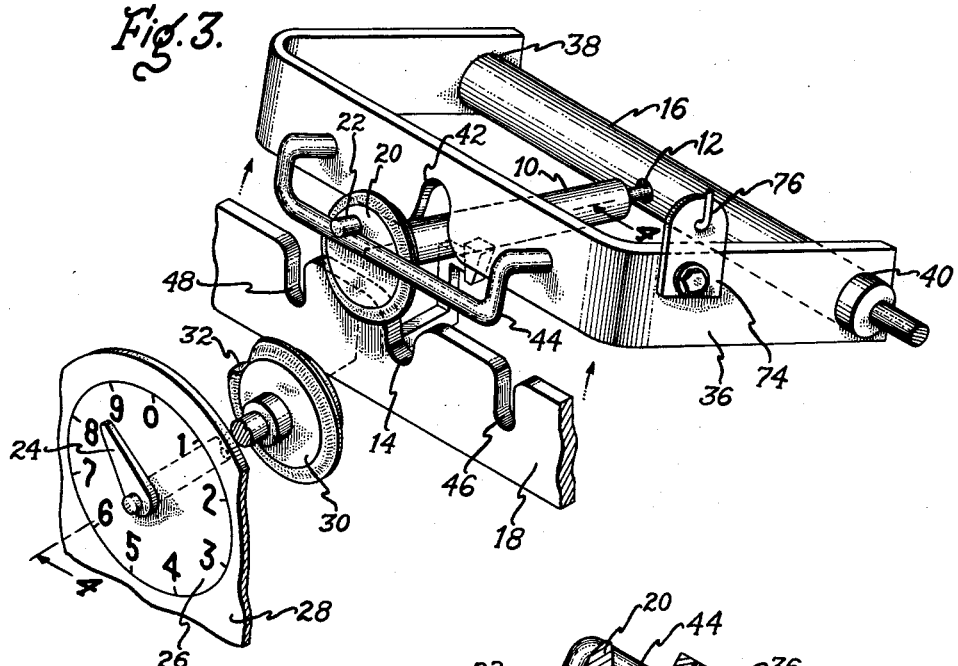
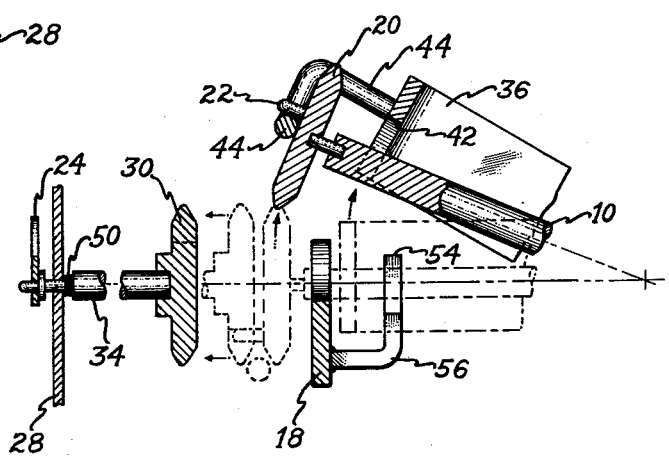

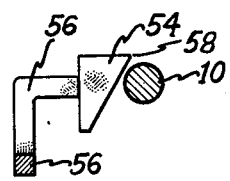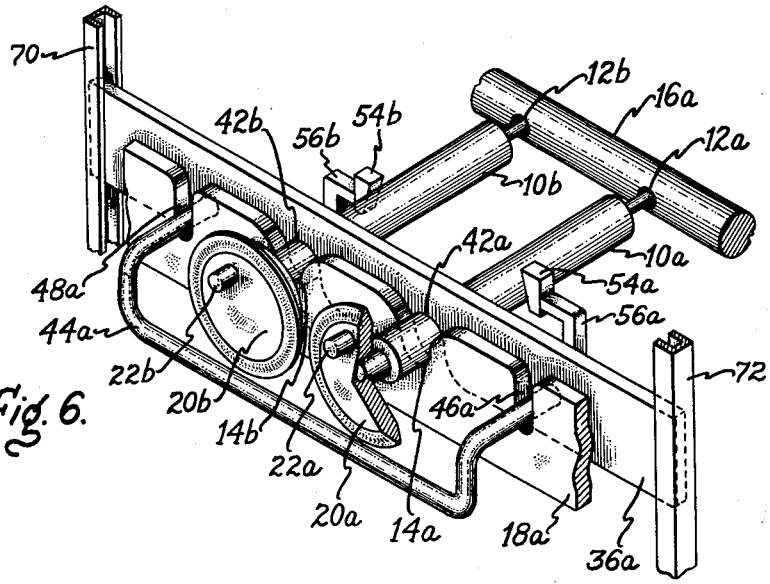

United States Patent Office 3,075,392
Patented Jan. 29, 1963

3,075,392
MECHANISM FOR RESETTING ROTATABLE SHAFTS
Donald M. Ham, Rochester, N.H., assignor to General Electric Company, a corporation of New York
Filed Jan. 23, 1961, Ser. No. 84,380
4 Claims. (Cl. 74—1)

This invention relates to a resetting mechanism and more particularly to a mechanism for resetting rotatable shafts.

In many types of devices utilizing rotatable shafts it is desirable at some point of the operation of the device to either position or reposition the rotatable shafts to a fixed or a predetermined position. In many instances where the shaft does not make a large number of revolutions, it is common practice to provide a pinion on the shaft and to drive a large diameter sector gear from such pinion. The gear ratio in such instances is selected such that the sector gear will not move through a large angle. It is then a simple matter to reset the moving shaft to a fixed position by returning the sector gear to its former position. However, where a shaft or shafts, to be reset to a fixed or predetermined position, may make a large number of revolutions, it will be apparent that the pinion on the shaft will generally be driven beyond the range of the sector gear. It is also known to utilize a spring coupling between the shaft and the frame in which it is rotatably mounted, the spring storing up energy as the shaft is rotated and causing the shaft to be returned to its fixed position upon release of the means driving the shaft. Of course, it will also be apparent in the case of spring couplings that such resetting mechanism is of little utility in devices utilizing rotatable shafts which rotate through a large number of revolutions.

In those devices which utilize rotatable shafts rotating through a large number of revolutions, it has been known to provide a heart-shape cam on the shaft with a radially moving follower to provide the desired resetting. However, this type of device is subjected to sliding friction between the cam and the follower and the bearing reaction of such resetting mechanisms are many times that which is required for the use of pinions and sector gears. An additional objection to the use of a heart-shape cam with a radial follower is that there is a limited angular position when the point of the heart-shape cam is aligned with the tip of the follower. In such position no magnitude of force on the follower can cause rotation of the shaft. It is also known to utilize offset weights on a support means on the rotatable shaft or on a portion of the rotatable shaft such that when the shaft is moved for resetting the unbalanced weight will cause the shaft to rotate to the desired reset position. However, the use of unbalanced weight also adds an additional bearing reaction in the form of friction torque. Also, the use of shafts with unbalanced weights results in a pulsating drive torque which, as will be understood, is very undesirable in many types of rotatable shaft driving mechanisms. Of course, it will be understood that the use of offset weights also results in a mechanism having a limited angular position when the weights are substantially 180° out of the desired reset position where there will be no restoring torque and thus the shaft will not be reset during the desired resetting operation. However, in spite of the additional resetting torques which are necessary to overcome the various friction torques and bearing friction, and despite the probability of failure occurring, the heart cam device and the offset weights have been utilized in resetting rotatable shafts which rotate through a large number of revolutions because no better device has been provided to the art.

As an example of one of the possible devices which would utilize the resetting mechanism of the prior art or of that disclosed in this application, a patent application Serial No. 71,353, filed November 23, 1960 for an indicating demand meter in the name of the instant inventor and assigned to the same assignee of the present invention, discloses such a device. In that invention there is disclosed an indicating demand meter in which a plurality of shafts are driven through a number of rotations to provide an accurate indication of the demand used during a given demand interval. At the end of each demand interval it is necessary to reset the shaft to a zero position and then to again drive such shaft as an indication of a succeeding demand. It will be apparent from the following description that the device disclosed in this invention will be appropriate for resetting a number of shafts to a given zero position, such as the shaft of the indicating demand meter of the above-noted patent application.

From the above discussion, it can be seen that in various devices utilizing rotatable shafts where it is desired to position or reposition the rotatable shaft to a fixed or a predetermined position, that it is desirable to provide a method of repositioning which will positively and accurately return the rotating shaft to such predetermined position. Further, it will be apparent that there is a need in the art to which this invention pertains for a resetting mechanism to position or reposition rotatable shafts which will not introduce superfluous friction torques to the rotatable shafts.

It is, therefore, one object of this invention to provide a mechanism for resetting rotatable shafts wherein there is no limited position in which the shaft will not be reset by the resetting mechanism.

It is another object of this invention to provide a resetting mechanism for resetting rotatable shafts which will not introduce additional friction torque to the resetting mechanism or the rotatable shaft.

It is a further object of this invention to provide a resetting mechanism for resetting rotatable shafts without the use of additional weights added to the rotatable shaft means.

Still another object of this invention is to provide a resetting mechanism for resetting rotatable shafts in which a low weight rotatable shaft may be utilized.

A further object of this invention is to provide a resetting mechanism which will provide rapid and accurate repositioning of a rotatable shaft regardless of the number of rotations made by such shaft.

In carrying out this invention in one form, a rotatable shaft is provided, the shaft being rotatably mounted in a bearing at one end and having a partial bearing at the opposite end thereof. A plate member is fixedly mounted at such opposite end of the rotatable shaft, having a pin member mounted on such plate member, the pin being mounted in a position axially offset from the axis of the rotatable shaft. The resetting member comprises a removable bearing cap with the resetting member being movable about an axis or through a plane which is perpendicular to the axis of the rotatable shaft. A follower is connected to such resetting member and is adapted to contact the pin member when said resetting member is moved. The follower lifts the rotatable shaft out of said partial bearing, thus causing the pin member and rotatable shaft to rotate about the end of said shaft mounted in the bearing, thereby resetting the rotatable shaft.

The invention which it is desired to protect by this application is particularly pointed out and distinctly claimed in the claims appended hereto. However, it is believed that the objects of this invention, as well as other objects and advantages thereof, will be more clearly understood by reference to the following description when taken in connection with the accompanying drawings wherein:

FIG. 3 is a perspective view of the shaft resetting mechanism made according to the form of the invention as shown in FIG. 1, with the parts in their resetting position;

FIG. 4 is a side view in section of the resetting mechanism with the parts shown in their resetting position, taken on the line 4—4 of FIG. 3;

FIG. 5 is a section view taken on the line 5—5 of FIG. 1, showing one detail of the invention; and FIG. 6 is a partial perspective view of the resetting mechanism of this invention showing it being utilized with a plurality of resettable shafts.

Figure 1:
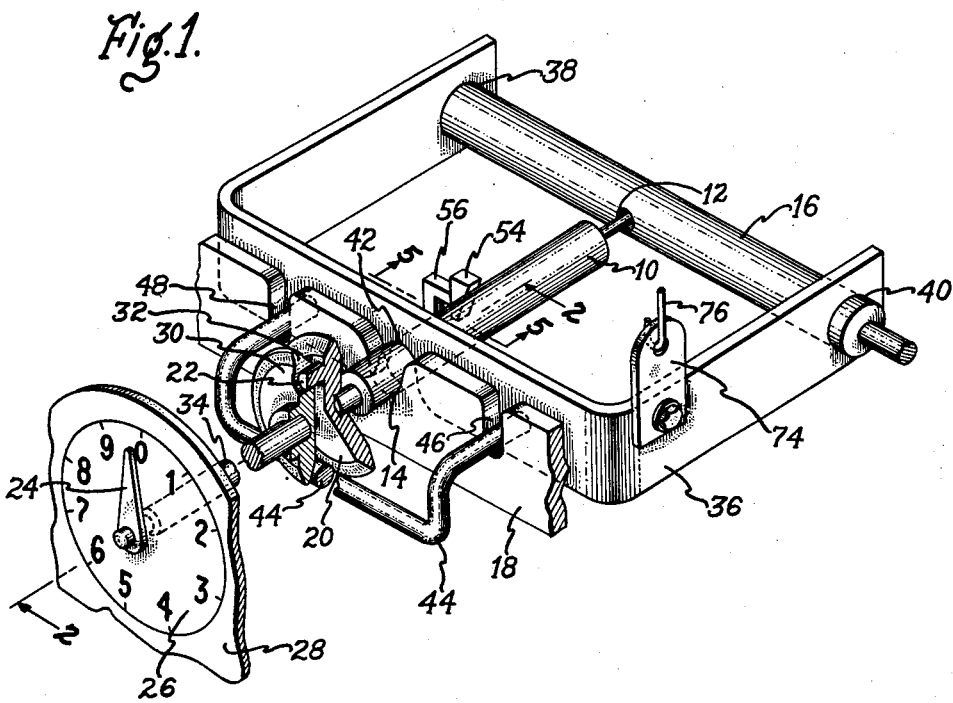
FIG. 1 is a perspective view of a shaft resetting mechanism made in accordance with one form of this invention.

Referring now to the drawings in which like numerals are used to indicate like parts throughout, there is shown a rotatable shaft member which it is desired to reset to a fixed or a predetermined position and a resetting mechanism mounted so as to be movable into contact with the rotatable shaft so as to lift the rotatable shaft out of its partial bearing. As the resetting mechanism lifts the rotatable shaft out of its partial bearing, the rotatable shaft is caused to rotate about a bearing which is located at the opposite end of the rotatable shaft, thereby causing the shaft to rotate to the desired predetermined or fixed position.

Referring now to FIG. 1 of the drawing, the rotatable shaft 10 is shown, one end of the rotatable shaft being mounted in a bearing 12, while the other end of the rotatable shaft is mounted in a partial bearing 14. The bearing 12 is formed in a member 16, which may be fixed or rotatable, as desired, and which is mounted on the side walls (not shown) which forms the casing of the device, for example, an instrument or a meter, of this invention. The partial bearing 14 is similarly formed in a member 18 which is also mounted on the side walls forming the casing of the device which utilizes the rotatable shaft 10. The rotatable shaft and resetting mechanism of this invention is shown as being used to reset a rotatable shaft which is used to drive a pointer, for example, one of the pointers of the maximum demand meter set forth in patent application Serial No. 71,353 previously mentioned herein. As shown in FIG. 1, mounted at the front portion of the rotatable shaft 10 beyond the partial bearing 14, is a member in the form of a plate or disc 20. The disc 20 is firmly fixed to the rotatable shaft 10 so as to rotate therewith. Mounted on the front of the disc 20 is a pin member 22, the pin member 22 being axially offset from the axis of the rotatable shaft 10. As will be understood by those skilled in this art, the disc member 20 may be in the form of a gear which is driven by a gearing means (not shown) so as to drive the pointer member 24 about the indicating dial 26 which is mounted on the front wall 28 of the casing. Pin 22 makes contact with a second disc 30 through a groove or slot 32 formed in the disc member 30. This groove or slot 32 is more clearly shown in FIG. 3 of the drawing. Firmly fixed to the driven disc 30 is a shaft member 34 which is mounted in a bearing in the front wall 28. The pointer member 24 is firmly fixed to the front end of rotatable shaft 30 so as to be rotated therewith. From the above, it can be seen that as the rotatable shaft member 10 is driven, for example, by means of a gear (not shown) driving the disc 20, pin 22 will drive disc 30 through groove member 32 thereby rotating pointer member 24 through the rotatable shaft 34.

Figure 2:
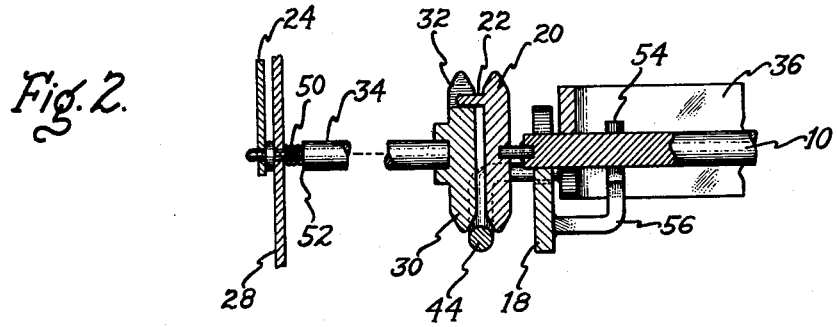
FIG. 2 is a side view in section of the resetting mechanism, taken on the line 2—2 of FIG. 1.

When the rotatable shaft member 10 is used in a device, such as for example a maximum demand meter, where it is desired to reset the shaft at various intervals so as to record a later reading of demand, it is necessary that the shaft member 10, its disc 20, and pin 22, be reset to a fixed or predetermined position while at the same time leaving the pointer member 24 at its previous reading. To obtain this desired resetting, the resetting mechanism of this invention may be utilized. The resetting means of this invention comprises a resetting member 36 which may take the form of a U-shaped cradle as shown in FIGS. 1 and 3, the cradle 36 being pivotally mounted about the support member 16 by bearings 38 and 40. A bearing cap 42 is formed in the resetting member 36, fitting about the rotatable shaft member 10 and completing the partial bearing 14, as shown. A reset follower 44 is fixed to the front portion of the reset member 36 and is formed so as to extend beneath the disc members 20 and 30 when the reset member is in its at rest or non-resetting position, which is shown in FIGS. 1 and 2. In order to provide such desired mounting of the resetting follower 44, the follower may be in the shape of a U-follower having the front portion thereof extending in a downwardly direction at right angles from the base portion of the legs. In order to allow the follower member 44 to extend beyond the fixed member 18 slots 46 and 48 are provided in the member 18 in the manner shown. Of course, it will be understood that pivotal mounting of reset member 36 is not necessary. Any other mounting means may be utilized so long as the member 36 and follower 44 are movable to contact pin 22 and remove bearing cap 42. For example, member 36 could be movable in vertical slides 70, 72, if desired, as indicated in FIG. 6.

Referring now to FIGS. 3 and 4 of the drawing, when it is desired to reset the shaft member 10 and its rotating or driving disc 20, the reset member 36 is pivoted upwardly about the shaft or member 16 in any desired manner. For example, a tab 74, attached to cradle 36, may be connected to a reset timing mechanism through link 76, as more fully described in the aforementioned patent application, Serial No. 71,353. As the resetting member 36 is pivoted in an upwardly direction, the follower member 44 will be lifted between the two disc members 20 and 30, thus separating such members in the manner more clearly indicated in FIG. 4 of the drawing. In order to provide the desired separation of the discs 20 and 30, either of the discs may be mounted so as to be movable in a direction away from the other disc. For example, as shown in FIG. 2 of the drawing, disc 30 and shaft 34 are mounted so as to be movable to the left as viewed in FIG. 2. The movable mounting of the disc 30 may be provided, for example, by having the front end of the shaft 30 turned, as shown, so as to be slidable in the bearing in wall member 28. A spring means 50 is provided, wrapped about the reduced portion of the shaft 34 bearing against the wall member 28 and a shoulder 52, formed on shaft 34. In this manner, the spring means 50 holds the disc 30 in the desired relation to disc 20 so that it may be driven by the pin 22. However, when the follower member 44 is pulled up between the two discs 20 and 30, the follower member 44 will force the disc member 30 in a forward direction, compressing the spring 50 and providing clearance to allow the disc member 20 to be raised in an upward direction. Of course, it will be understood that as an alternative method the disc member 20 could be moved to the right as viewed in FIG. 2. This could be done, for example, by providing a slidable bearing means at 12 with a spring wrapped about the reduced portion of the rotatable shaft member 10 such that the disc 20 and rotatable shaft 10 would be moved to the right as viewed in FIG. 2, compressing the spring and, in a similar fashion, providing the desired clearance between the discs 20 and 30.

As reset member 36 is pivoted in an upward direction and follower member 44 is inserted between the discs 20 and 30, the bearing cap 42 will be raised from the rotatable shaft 10, thereby reducing, to a considerable extent, the friction between the rotatable shaft 10 and its bearing 14 and 42. As the reset member 36 is raised further, the follower member 44 contacts the pin 22 on disc 20 and will begin to lift the shaft 10 out of its bearing 14. At this point, the rotatable shaft 10 will be rotatably mounted only about the bearing 12 in the member 16. If the rotatably shaft member 10 is correctly balanced, and with only the friction of bearing 12 holding the shaft member 10 in the position which it had obtained just prior to the resetting of the shaft, the weight of the shaft about the pin 22 will cause the shaft 10 to rotate in a manner such that the pin 22 will be at the top end of the disc 20. From a consideration of the friction forces at work and the moment arm from the pin 22 to the bearing 12, it will be apparent that the equalibrium position of the shaft 10 will be at that point where the pin member 22 is in the extreme vertical position shown in FIGS. 1 and 2 of the drawing. Obviously by correctly placing disc member 20 on shaft 10 and properly locating pin 22 such that at the desired predetermined or fixed position of rotatable shaft 10, the pin 22 is in the uppermost position, the desired resetting of shaft 10 may be obtained by means of the reset mechanism herein disclosed.

In the mounting of the reset member 36 about shaft 16, it is herein described as being pivotal about the shaft 16 by means of bearings 38 and 40. In a similar manner, the shaft member 10 is mounted in the bearing 12 such that it will be capable of pivoting the distance necessary to provide the desired resetting without movement of the shaft 16. Of course it will be apparent that, if desired, the bearing 12 may be a very tight bearing not allowing pivoting motion of the shaft 10 and in such instance the member 16 will be pivotably mounted within the casing of the device so that as the rotatable shaft 10 is pivoted in an upward direction to provide the resetting of the shaft, the member 16 will rotate so as to allow such pivotal motion of shaft 10.

It will be understood that due to the moment arm of the weight of the shaft about the pin 22 and the pivot 12 that the rotatable shaft 10 will be reset to the desired fixed or predetermined position by means of the resettable mechanism herein described. However, at the 180° position of pin 22, that is when the pin 22 is in its lowermost vertical position exactly 180° away from the desired zero or reset position, it is possible that an equilibrium position may be obtained such that on raising of the reset member 36, the follower 44 will engage pin 22 and lift the shaft 10 without providing a disturbing moment about the bearing 12 to provide the desired resetting action. In order to obviate any possibility of a failure of reset at this 180° position of pin 22, a bumper device 54 is provided, being fixedly attached to the member 18 by means of the support arm 56, as shown in FIG. 5 particularly. The bumper device 54 is preferably triangular shaped and has its top point 58 in interfering position with the vertical movement of the shaft 10. Therefore, when shaft 10 is raised in a vertical direction, the shaft 10 will be caused to bump the point 58 of bumper 54 and be moved slightly to the right as it bypasses the bumper 54. This movement slightly to the right as viewed in FIG. 5, will provide a sufficient disturbance of the shaft 10 about bearing 12 to cause rotation of the shaft to upset any possibility of an equilibrium position being reached at the 180° position of the pin 22. Thus, by means of the bumper 54 to provide a disturbing movement to the shaft, the desired resetting of the shaft member 10 is assured.

FIG. 6 shows the use of the resetting mechanism of this invention for providing the desired reset of a number of rotatable shafts. As shown in FIG. 6, rotatable shafts 10a and 10b each are provided with a disc member 20a and 20b, respectively, mounted thereon and having the pin members 22a and 22b, respectively, on such discs. The shafts 10a and 10b are mounted in the partial bearings 14a and 14b which are formed in the fixed support member 18a in the same manner as hereinbefore discussed with reference to FIGS. 1 through 4. The reset member 36 forms two partial bearings, or bearing caps, 42a and 42b which complete the partial bearings 14a, 14b in a manner previously described, and follower member 44a is attached to the reset member 36 and extends through slot members 46a, 48a, formed in the support member 18a. In the manner previously set forth with reference to the embodiment in the invention disclosing the single rotatable shaft, as the reset member 36a is moved in an upward direction, the follower member 44a contacts the pins 22a, 22b and lifts the shaft members 10a, 10b out of the partial bearings 14a, 14b. As hereinbefore discussed, the friction of the shafts 10a, 10b about their bearings 12a, 12b will not be sufficient to overcome the weight of the shaft and the moment arm from the pin 22 to the shaft bearings 12. Thus, each of the disc members 20a, 20b will be caused to rotate until the pins 22a, 22b are in the uppermost vertical position. This will be the desired predetermined or fixed position of the shaft members 10a, 10b desired for the resetting position. In FIG. 6, rather than pivotal mounting of reset member 36a, an alternate movable mounting is shown. Reset member 36a is slidably mounted in vertical slides 70, 72 and is lifted upwardly to provide the desired resetting of shafts 10a and 10b.

From the above, it will be obvious that there has been disclosed herein a resetting mechanism which may be utilized to reset a rotating shaft member to a fixed or predetermined position regardless of the number of rotations through which the rotatable member may have been moved. It will also be apparent that by means of this invention the movement of the reset member through a predetermined distance will provide the desired accurate resetting of the rotatable shaft to its predetermined position. It will also be apparent that the reset mechanism of this invention will provide an accurate resetting of the rotatable shaft member or members regardless of the positions which they have obtained. That is, even though the shafts are reset when they are in the exact 180° position away from the desired reset position, the reset mechanism of this invention will still provide the desired resetting to the given predetermined position. Therefore, while there has been disclosed and described, the present preferred embodiment of this invention as required by the patent statutes, it will be obvious to those skilled in this art that various changes may be made in the operation or the structural design of the various components of this invention without departing from the spirit and scope of the invention as set forth in the appended claims.

What is claimed as new and which it is desired to secure by Letters Patent of the United States is:

1. A reset mechanism for resetting a rotatable shaft to a predetermined position comprising; a rotatable shaft having one end mounted in a bearing member, the opposite end of said rotatable shaft being mounted in a partial bearing member, a disc member fixed to said opposite end of said rotatable shaft for rotation therewith, a pin member mounted on said disc member, said pin member being mounted axially offset from the axis of said rotatable shaft, a reset member, a partial bearing formed in said reset member, a follower member mounted on said reset member and extending below said disc member whereby as the reset member is raised, said follower member contacts said pin member to lift said rotatable shaft out of said partial bearing and thereby cause said rotatable shaft to rotate to its desired fixed or predetermined position.

2. A rotatable shaft, bearing means, one end of said rotatable shaft being mounted in said bearing means, a partial bearing, a portion of the opposite end of said rotatable shaft being movably mounted in said partial bearing, a disc member fixedly mounted on said opposite end of said rotatable shaft, a pin member mounted on said disc member and being axially offset from the axis of said rotatable shaft, a reset member, a bearing cap being formed in said reset member and adapted to complete said partial bearing, a follower member mounted on said reset member, said follower member extending from said reset member to a position below said disc member and adapted to contact said pin member whereby as said reset member is raised, said bearing cap is removed from said rotatable shaft and said follower member contacts said pin member on said disc member, lifting said rotatable shaft out of said partial bearing, the moment of forces about said fixed bearing being sufficient to cause said rotatable shaft to rotate until said pin member is in the uppermost vertical position whereby said rotatable shaft is in a desired predetermined reset position.

3. In a reset mechanism for a rotatable shaft for resetting the rotatable shaft to a predetermined position, a rotatable shaft, a bearing member, one end of said rotatable shaft being mounted in said bearing member, a partial bearing member, the opposite end portion of said rotatable shaft being movably mounted in said partial bearing member, a disc member fixedly mounted on said opposite end of said rotatable shaft, a pin member mounted on said disc member, and axially offset from the axis of said rotatable shaft, a reset member pivotally mounted upon an axis at right angles to the axis of the rotatable shaft, a partial bearing member formed in said reset member, said partial bearing member completing the first said partial bearing, a follower member mounted on said reset member and positioned below said disc member in a position to contact said pin member whereby as said reset member is pivoted about its pivots, said second partial bearing is removed from said rotatable shaft, said follower member contacts said pin member and lifts said rotatable shaft out of said first partial bearing and the moment of forces about said bearing member cause said rotatable shaft to rotate until said pin member is in its uppermost vertical position, thereby providing the desired reset position of said rotatable shaft.

4. A resetting mechanism for resetting a plurality of rotatable shafts to a fixed or a predetermined position comprising a plurality of rotatable shafts one end of each of said rotatable shafts being rotatably mounted in a bearing member, the opposite end portion of each of said rotatable shafts being mounted in partial bearing members, disc members mounted on said opposite ends of said rotatable shafts so as to rotate therewith, pin members on each of said disc members, said pin members each being axially offset from the axis of said rotatable shafts, a reset member, bearing caps formed in said reset member completing said partial bearings, a follower member mounted on said reset member and positioned below said disc members and adapted to contact said pin members, whereby as said reset member is raised, said bearing caps are removed from said rotatable shaft and said follower member contacts said pin members to lift said rotatable shaft out of said partial bearings, the moment of forces on each of said rotatable shafts about said bearing member thereby causing said rotatable shafts to rotate to said desired predetermined position.

No references cited.